Oct. 8, 1963     O. THOMA ETAL     3,106,108
HYDRAULIC APPARATUS
Filed Sept. 15, 1960     2 Sheets-Sheet 1
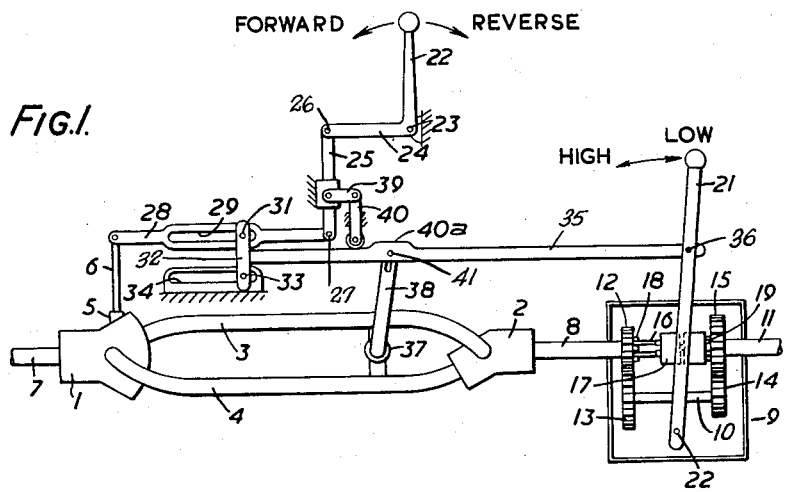
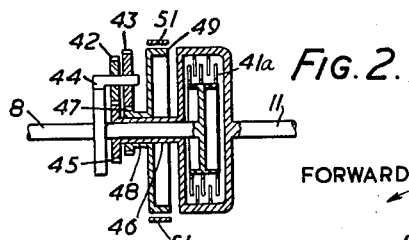
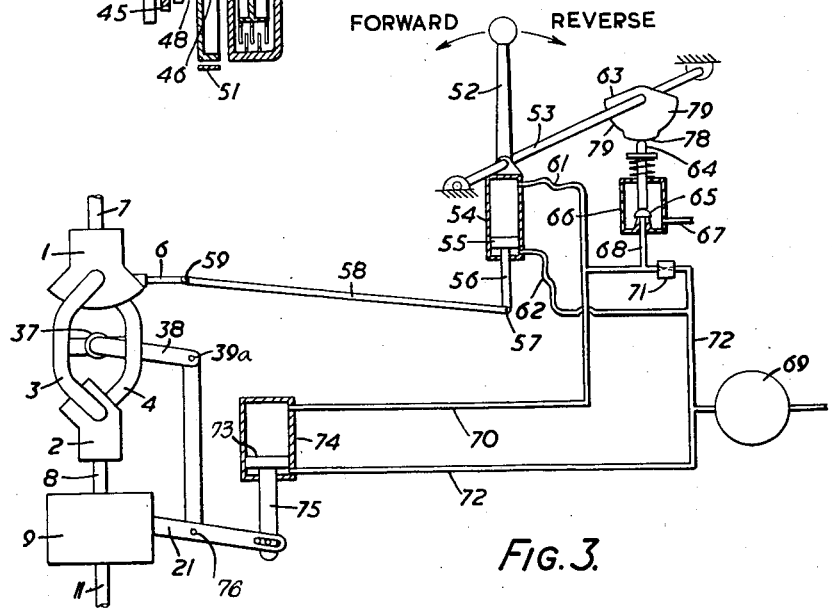
INVENTORS
OSWALD THOMA +
EDWARD V. WARD
BY
ATTORNEYS Oct. 8, 1963  O. THOMA ETAL  3,106,108
HYDRAULIC APPARATUS Filed Sept. 15, 1960  2 Sheets-Sheet 2

INVENTORS
OSWALD THOMA &
EDWARD V. WARD
BY
Reynolds &
Christensen
ATTORNEYS

3,106,108
HYDRAULIC APPARATUS
Oswald Thoma and Edward V. Ward, Cheltenham, England, assignors to Dowty Hydraulic Units Limited, Tewkesbury, England, a British company
Filed Sept. 15, 1960, Ser. No. 56,286
Claims priority, application Great Britain Sept. 17, 1959
6 Claims. (Cl. 74—733)

This invention relates to hydraulic apparatus, more particularly to hydrostatic power transmission, having a variable positive displacement pump adapted to be driven by a power source, such as a prime mover, and a positive displacement motor fed with hydraulic liquid from the pump, the motor being adapted for mechanical connection to drive the load. Such a hydrostatic transmission has a speed ratio range within which infinite speed variation is possible, extending from zero at zero pump displacement to a maximum at maximum pump displacement. Torque multiplication varies inversely with speed ratio over the majority of the speed ratio range where the transmission is efficient, but at low speed ratios it is usually found that torque multiplication cannot increase above a certain value. This is due to the fact that high torque multiplication demands high hydraulic pressures in the transmission, which must necessarily be limited to a maximum value for safety, and that at such high pressures and low pump displacements leakage of hydraulic liquid considerably reduces transmission efficiency. These difficulties occur in hydrostatic transmissions whether the motor is of fixed or variable positive displacement.

The object of the present invention is to extend, in a simple mechanical way, the effective torque multiplication range of a hydrostatic transmission.

In a hydrostatic power transmission, including a variable positive displacement pump and a positive displacement motor hydraulically interconnected one with the other, the present invention is characterized by the provision of a mechanical change speed gear having at least two fixed gear ratios located between the motor and the load, and a synchronizing device operable during change in mechanical speed gear to adjust pump displacement to cause the motor to rotate at a speed appropriate to the rotational speed of the load through the gear to be engaged. In this way, smooth and effective changing of the mechanical gear is possible. The mechanical gear may be adjustable into any of its gear ratios by direct mechanical engagement between the gears or rotating members attached to the gears. Alternatively, the gear ratios may be selected by engaging one or other of a number of frictional clutches. This latter method is preferred, since it eliminates the problem of engaging relatively moving gears or dog clutches and, when combined with the synchronizing device of the invention, enables particularly smooth gear changing to be effected.

The invention is of particular use where the load has a substantial inertia such that its speed is not likely to change substantially in the short period of time involved in changing the mechanical gear. A typical example of a load having substantially inertia is a vehicle propelled through the medium of the transmission, e.g. an earth mover. In order to make the changing of mechancial gear still smoother, it is further proposed, in accordance with this invention, to provide an unloading valve in the transmission which is so connected with the synchronizing device as to unload the transmission when the pressure difference exceeds a predetermined value at the period inbetween the engagement of alternative gears. Such partial unloading will allow the motor to rotate in response to hydraulic delivery from the pump without being able to exert any appreciable torque. Closing of the unloading valve occurs only when one or other mechanical gear has been engaged. The speed ratio of the transmission and the mechanical gear may be controlled by separate controls. It is also within the scope of the invention to combine the speed ratio adjustment and the mechanical gear for control from one lever, which determines the overall speed ratio and torque ratio of the transmission and mechanical gear box.

The synchronizing device may comprise a lever mechanism interposed between the speed ratio control of the transmission and the pump displacement control, arranged to vary the leverage during mechanical gear change in such manner as to alter pump displacement in accordance with the change in mechanical gear. Such lever mechanism may comprise a lever having an adjustable fulcrum or, alternatively, a lever of variable length. Where a single control of both speed ratio and mechanical gear is provided, one or more servomotors are arranged to operate simultaneously to change the mechanical gear and to adjust the lever mechanism.

It is further within the scope of this invention for the synchronizing device to comprise a friction clutch associated with each fixed mechanical gear ratio, a servomotor arranged for overriding control of pump displacement and valve means arranged to connect said servomotor to respond to transmission hydraulic pressure when a mechanical gear is being engaged, the friction clutch corresponding to the gear to be engaged exerting a torque on the motor to generate pressure in the transmission, the servo motor being responsive to said pressure to act on pump displacement in an overriding sense to tend to reduce the pressure to a minimum, thus to cause synchronization of the motor speed with the speed of the load through the gear ratio to be engaged.

Four examples of the invention will now be described with reference to the accompanying drawings, in which:

FIGURE 1 is a diagrammatic representation of the first example,

FIGURE 2 is a diagrammatic representation of an alternative mechanical gear box for inclusion in FIGURE 1, and:

FIGURES 3 and 4 are diagrammatic representations of the third and fourth examples.

Figure 4:
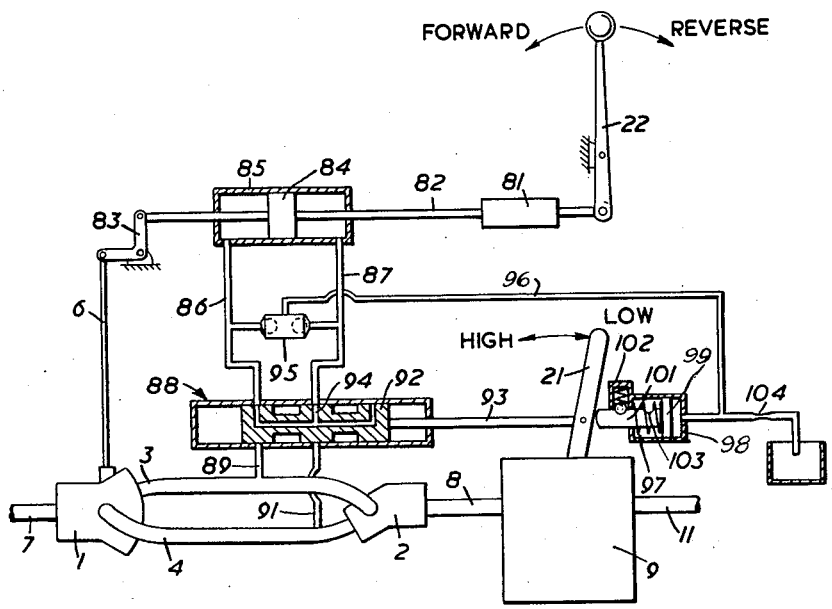

Reference is made initially to FIGURE 1 of the drawings. In this example, the transmission comprises a reversible variable positive displacement pump 1, a fixed positive displacement hydraulic motor 2 and a pair of pipelines 3 and 4 carrying liquid in opposite directions between pump and motor. Conventional means, not shown, are also provided for maintaining the transmission pump motor and the pipelines primed with liquid. Adjustment of displacement of the pump 1 is effected by means of a servomotor 5 formed as part of the pump 1, which is controlled by a control rod 6 movable longitudinally within the servomotor 5. The pump 1 has a drive shaft 7 by which it receives mechanical power from a prime mover or other power source. The motor 2 has a power output shaft 8 which transmits rotary power into the gear box 9. An output shaft 11 extending from gear box 9 extends to drive the load. Within the gear box 9 a pinion 12 is fixedly secured to the shaft 8 and is constantly in mesh with a larger gear 13 mounted for rotation on a secondary shaft 10 carried by suitable bearings within the gear box. The gear 13 through shaft 10 drives a further gear 14 of smaller size, which is in mesh with a larger gear 15 freely mounted on the output shaft 11, which extends from the gear 12 through gear 15. In between the two gears 12 and 15 the shaft 11 is splined as at 16 for reception of a dog clutch element 17 which is slidably mounted on the spline 16 and is engageable with dog teeth 18 and 19 formed respectively on the gears 12 and 15. The gear box 9, as shown, is a conventional gear box which is arranged when the dog clutch element 17 engages dog teeth 18 to cause rotational power from the shaft 8 to be transmitted directly to the shaft 11 whilst, when the dog clutch 17 engages dog teeth 19 the power is transmitted through gears 12, 13, 14 and 15 to the shaft 11 rotating this latter at a lower speed than the shaft 8. If the hydrostatic transmission has a useful speed ratio range of 3:1 over which torque ratio varies efficiently inversely to the speed ratio, it is then desirable that the ratio between the two gear ratios in the gear box should also be 3:1. For controlling movement of the dog clutch 17, a lever 21 is provided pivoted by a fulcrum 22 within the box 9. The lever 21 is extended for convenient operation by the operator of the transmission.

In order to adjust speed ratio of the transmission, a further control lever 22 is provided pivoted at fulcrum 23. Extension 24 of this lever carries a link 25 by means of pivot 26. Link 25 is pivotally connected at 27 to lever 28 which at its opposite end is pivotally connected to the servomotor control 6. Centrally of the length of the lever 28 a slot 29 is provided within which a fulcrum pin 31 is slidable. The fulcrum pin 31 is carried by a carrier 32, which is, in turn, slidably carried by engagement of pin 33 within a fixed slot 34. The carrier 32 is moved by means of a link 35 which is pivotally connected by pivot 36 to the gear change lever 21. An unloading valve 37 is connected across the transmission pipelines 3 and 4 and an operating lever 38 extending from valve 37 is pivotally connected to the rod 35. The valve 37 is so arranged that it opens to permit limited flow of liquid only at the centre of the range of movement of lever 38 but, at either limit of movement of lever 38, the valve 37 is closed. A clamp operated by lever 39 acts on rod 25 to clamp it in position when lever 39 is raised. A push rod 40 and cam 40a on link 35 raise lever 39 during movement of gear lever 21.

The whole transmission as described is suitable for power transmission between the engine and the ground engaging wheels of a vehicle. The engine is automatically governed to a constant speed. Assuming the transmission to be so installed, the vehicle driver when starting his vehicle will have lever 21 engaged in the low gear position and lever 22 at the central position corresponding to zero pump displacement. The rod 35 and the fulcrum carrier 32 will be at the right-hand extremity of their movement as shown in FIGURE 1. To start the vehicle, the driver will move the displacement control lever 22 to rock the lever 28 about its fulcrum pin 31 and so to give some displacement to pump 1, which will cause motor 2 to rotate output shaft 8. Such rotation is transferred through the reduced gear of gear box 9 to drive the output shaft 11 at a lower speed with a considerable torque. The vehicle will thus accelerate and at a certain speed, assuming the vehicle is running on the level, the driver will move the gear lever 21 counterclockwise to the high gear position. Such movement will cause rod 35 to move to the left, to displace the fulcrum pin 31 to the left, and so to reduce the displacement movement applied to servo control rod 6, thus reducing displacement of the pump 1. During movement of the gear lever 21 in between engagement of the two gears, lever 38 will be in its mid-position and will allow flow of liquid between pipelines 3 and 4 if there is sufficient pressure difference. Because of such hydraulic unloading at this stage the motor exerts substantially no torque and the pressure differential between pipelines 3 and 4 is quite low. As displacement of the pump 1 is reduced, the pressure between pipelines 3 and 4 need only be sufficient to cause motor 2 to slow down to a speed corresponding to the displacement of pump 1. As the dog clutch 17 engages the dog teeth 18, the motor speed will have dropped to the extent that the speed of shaft 8 approximates the speed of shaft 11, and at the engagement of this dog clutch with teeth 18, lever 38 will move valve 37 to the closed position, thus enabling the motor again to exert torque. Also during movement of gear lever 21, rod 25 and control lever 22 are locked by operation of clamp lever 39 by cam 40a. At either gear position of lever 21, cam 40a allows clamp lever 39 to move to the unlocked position. Power is now transmitted through the hydrostatic transmission employing the higher gear ratio of box 9. The vehicle speed may now be raised to any desired value as selected by the movement of lever 22. If the vehicle climbs a gradient the driver will necessarily move lever 22 towards a lower pump displacement position, to ensure that sufficient torque is generated at the output shaft 11, so that the vehicle may climb the gradient. If the driver needs to pull lever 22 close to the central position corresponding to a very small pump displacement, he will appreciate that the transmission is operating at its maximum torque capability and he will then move lever 21 from high to low gear position. Such movement will cause movement of fulcrum 31 to its right-hand position increasing a selected pump displacement so that motor 2 rotates at a high speed at the actual instant of engagement of the lower gear by means of the dog clutch 17. The transmission can now operate within its range of efficient torque conversion and the vehicle is able to climb the gradient. Gear changing and speed ratio changing operate similarly for reverse movement as selected by reverse movement of control lever 22.

If, when the vehicle is travelling at a higher speed in the higher gear, the driver attempts to engage the lower gear, the rod 6 will be moved to the maximum displacement position before the fulcrum pin 31 can reach the end of slot 29. Since under these conditions lever 28 is inclined to slot 34, it will be seen that pins 31 and 33 will wedge in their slots at the full displacement position of rod 6 and the carrier 32 will be prevented from moving fully to the right to permit engagement of low gear. The driver will thus realize that engagement of low gear is not possible at that vehicle speed and that vehicle speed will need to be reduced for low gear engagement.

An alternative to the mechanical engagement of moving members in the gear box to cause engagement of the gears is to use frictional engagement members, as shown by way of example in FIGURE 2. In this arrangement, the motor shaft 8 is connectable by means of a friction clutch 41a with the output shaft 11, in order to engage the higher speed drive. For the lower speed drive an epicyclic reduction gear is provided comprising a pair of epicyclic gears 42 and 43, rotatably mounted on a carrier 44 driven by the shaft 8. The gear 42 engages with a gear 45 fixed by means of sleeve 46 to the output shaft 11, whilst the gear 43 engages a gear 47 formed on a sleeve 48 secured to a rotary drum 49. The drum 49 may be prevented from rotation by engagement with a friction band 51. The control lever for this transmission is arranged to cause alternative engagement of the clutch 41a, or of the friction band 51, corresponding to high and low speed ratios. Since there is no provision for engagement of moving gear or dog clutch teeth in this arrangement, it is always ensured that gear engagement is silent. However, the provision of the synchronizing device of the invention comprised by rod 35 and carrier 32, together with adjustable fulcrum 31, ensures that during the changing of mechanical gear the actual engagement of friction clutch 41a, or the friction band 51, can be effected without causing a jerk or a shock in the transmission. Other than this, operation is substantially as described with reference to FIGURE 1.

Reference is now made to FIGURE 3 of the accompanying drawings. Where possible, similar reference numerals will be used to those used in FIGURE 1. The hydrostatic transmission is again formed by the pump 1, the motor 2 and pipelines 3 and 4. The pump includes an input shaft 7 and the motor drives an output shaft 8 forming the input to a two-speed gear box 9 having an output shaft 11. An unloading valve 37 is also provided operated by lever 38. For control of the combined transmission, a single control lever 52 is provided movable within a gate from the central zero position giving forward speed in one direction and reverse in the opposite direction. The lever 52 is pivotally carried on a shaft 53. The lever 52 has mounted thereon a cylinder 54, within which a piston 55 and piston rod 56 are slidably mounted. The piston rod 56 extends in a direction away from the fulcrum 53 and is pivotally connected at its outer end 57 to a rod 58 which, in turn, is pivotally connected to the servo control rod 6 at position 59. The rod 58 is long in comparison with the stroke of the piston rod 56 and is arranged to extend substantially at right angles to the direction of movement of piston rod 56. The upper and lower ends of the cylinder 54 are fed with hydraulic liquid through flexible pipes 61 and 62.

The shaft 53 is rotatable with the lever 52 and it carries a cam 63 which co-operates with a follower 64. Follower 64 is spring loaded against the cam and controls a servo vent valve 65 enclosed in a casing 66. A pipe 67 extending from the casing 66 extends to the hydraulic reservoir at low pressure. A servo vent pipe 68 is controlled by the valve 65 and this pipe carries liquid from a pressure source 69 which may conveniently comprise the priming pump of the transmission. The supply of liquid from the source 69 to the vent pipe 68 takes place through a restrictor 71, the arrangement being that when the vent valve 65 is closed the pressure in pipe 68 is at the pressure within the source 69 whilst, when the valve 65 is open, flow takes place from the source through restrictor 71 and valve 65, causing a substantial pressure drop within pipe 68. The pipe 68 is connected by flexible pipe 61 to the upper end of the cylinder 54. The pipe 62 extending from the lower end of cylinder 64 is connected to the full pressure from the source 69 which flows through pipe 72. For the purpose of changing the mechanical gear, a further servo piston 73 is provided, slidably mounted in servo cylinder 74, piston rod 75 extending from the piston through the cylinder. Piston rod 75 is pivotally connected at 39a to the unloading valve lever 38 and at pivot 76 to the gear box lever 21. Pipe 70 extends from pipe 68 to the upper end of cylinder 74 whilst pipe 72 carrying full pressure from the source 69 extends to the lower end of cylinder 74. The two servo piston and cylinder units, 54, 55 and 73, 74 are both of the differential area type and the full upper areas of the pistons are acted upon by pressure within pipe 68. In both cases a piston rod extends downwardly from the piston through the cylinder, leaving a smaller lower area of the piston over which all pressure from the pipe 72 may act. Thus, when the valve 65 is open and pressure reduced in the pipe 68, both piston 73 and 55 will move to the upper ends of their cylinders whilst, when the valve 65 is closed and the pressure in pipe 68 is that of the source 69, both pistons will move to the lower end of their cylinders. The cam 63 over the central part of its surface is of circular form as indicated at 78, struck about the centre of shaft 53. The two outer portions 79 of the cam surface are also circular and are struck at a slightly smaller radius about the centre of shaft 53. Thus, over the central part of the movement 52, the follower 64 is depressed to close valve 65 and at the two extremes of movement of the lever 52 the valve 65 is lifted to vent pipe 68 to low pressure.

The transmission as described is intended for the propulsion of a vehicle by transmitting power from an engine to the ground engaging wheels. The engine is governor controlled to a constant speed and the driver merely needs to operate the lever 52 to control the speed of vehicle movement, and whether forward or reverse. At the central position of the lever, valve 65 is closed and pistons 55 and 73 are at their lowermost position, which means that low gear is engaged in gear box 9 by lever 21 and the pump 1 is at zero displacement. Slight counterclockwise movement of the lever 52 to move the vehicle, for example, forwardly, results in movement to the right of the lower end 57 of piston rod 56 moving the servo control rod 6 outwardly to give pump 1 displacement in the forward direction. The displaced liquid causes rotation of motor 2 which is transmitted at a reduced gear ratio through the gear box 9 to output shaft 11 to rotate the ground engaging wheels. Torque multiplication in the gear box 9 enables a substantial torque to be applied to the wheels. As vehicle speed increases, the driver pushes lever 52 further forwardly and at a position corresponding with substantially the maximum displacement of the pump 1, the follower 64 will leave the cam surface 78 and move to cam surface 79, opening the valve 65 and venting pipe 68. Thus, the pressure at the upper ends of cylinders 54 and 74 is reduced and the pistons 55 and 73 rise to the upper ends of their cylinders. This simultaneously results in reduction of the selected displacement given to the pump 1, changing of the gear in the gear box from low to high gear, and movement of the unloading valve from closed through an open position and back to closed again. Further movement of lever 52 in the forward direction will increase the pump displacement to raise the vehicle speed further. If, for example, the vehicle needs to climb a gradient, the driver will move the lever 52 slightly towards the centre to reduce displacement of pump 1, so that a sufficient torque is generated at motor output shaft 8 to move the vehicle up the incline. If the incline is comparatively steep, the driver will move the lever further back and at the junction of the cam surfaces 79 and 78 the follower 64 will move to close valve 65, causing simultaneous upward movement of pistons 73 and 55. This will act simultaneously to reduce the selected gear ratio in the gear box 9, to increase selected pump displacement and to take the unloading valve 37 from closed through the open position and back to closed again. The transmission is now in the low gear position and torque multiplication is obtained by the gear box. Further multiplication may then be obtained by moving the lever 52 nearer to the centre position, reducing the pump displacement to a lower value. When the lever approaches the central position, the whole transmission will be exerting a maximum torque. The gear box 9, shown in FIGURE 3, may be either of the gear boxes illustrated in FIGURE 1 or FIGURE 2. The example shown in FIGURE 3 will operate similarly when reverse gear is selected.

Reference is now made to FIGURE 4 of the accompanying drawings. Again, where possible, similar reference numerals will be used to those used in the earlier figures. The hydrostatic transmission comprises a reversible variable positive displacement pump 1, a fixed positive displacement motor 2 and the interconnecting pipelines 3 and 4. The motor output shaft 8 drives a gear box 9, whose output shaft 11 is connected to drive the load. The gearbox 9 may be of the type illustrated in FIGURE 2 or, alternatively, it may be of the type normally known as synchro-mesh. The essential feature of either of these known gear boxes is the provision of a friction clutch device for each gear ratio of the gear box, engagement of the friction clutch permitting the engagement of the selected gear ratio. A gear lever 21 operates the gear box 9 to select either a high or a low gear ratio. The displacement of the transmission pump 1 is controlled by lever 22 which acts through a caged spring unit 81, link 82, and bell crank lever 83, to control movement of the servo control rod 6. Mounted on the rod 82 is a piston 84 movable within a fixed cylinder 85, capable of accommodating full movement of the piston 84 within the range from full reverse displacement to full forward displacement of pump 1. A pair of pipelines 86 and 87 are connected to the two ends of cylinder 85, these pipes terminating at a piston valve 88. Corresponding pipes 89 and 91 extend from the piston valve 88 respectively to the transmission pipelines 3 and 4. The piston valve 88 includes the movable valve member 92, having three spaced lands and an operating rod 93 extends from this valve member for pivotal connection with the gear lever 21. The arrangement of the piston valve member is such that when the valve member is at either of its two gear engaged positions, the flow of liquid through the valve between pipes 89 and 86 on the one hand and 91 and 87 on the other hand is blocked, but at positions of the gear lever 21 intermediate the gear engaged positions, pipe 89 is connected to pipe 86 and pipe 91 is connected to pipe 87 whereby the pressures existing in pipes 3 and 4 are arranged to act on opposite sides of the piston 84. A passage 94 within valve member 92 interconnects pipes 86 and 87 to allow flow of liquid between the two ends of cylinder 85 when the piston valve member 92 closes the pipes 89 and 91. A pair of non-return valves 95 is connected across the two pipelines 86 and 87 which operates to feed to a pipe 96 the higher of the two pressures existing in the pipes 86 and 87. Pipe 96 extends to a cylinder 98 located adjacent to the gear lever 21. A piston 99 within the cylinder 98 has a piston rod 101 which extends towards lever 21 and is capable, when piston 99 is urged from cylinder 98, of preventing lever 21 from engaging the low gear position. A spring 97 within the cylinder acts to hold piston 99 in the withdrawn position. A spring loaded detent 102 forming part of cylinder 98 is arranged to engage with a notch 103 in piston rod 101 when the latter is fully extended from cylinder 98 so as to prevent the cylinder from returning easily. It is arranged that piston 99 may be returned in the absence of liquid pressure in pipe 96, provided a considerable force is exerted on the lever 21.

The transmission as described in FIGURE 4 is intended for use in a vehicle to transmit engine power for propulsion of the vehicle through ground engaging wheels. The engine need not be controlled to a constant speed. When the driver starts the vehicle from rest, the gear lever 21 is in the low gear position and the lever 22 is pushed forwardly to a small extent to give a small displacement to the transmission pump 1. This will result in liquid being pumped at a slow rate through pipeline 4 to motor 2, return liquid flowing from motor to through pipeline 3 into the pump 1. Since the gear box is engaged in low gear, the torque developed at motor shaft 8 is multiplied within the gear box to give a high torque at the output shaft 11. After the vehicle has obtained a desirable low speed and assuming that it is travelling substantially along the level, the driver will push the gear lever 21 from the low to the high gear position. This movement will result in the piston valve 88 being moved to cause pipe 89 to be connected to pipe 86 and pipe 91 to be connected to pipe 87. In between the engaging position of the two gears within the gear box no load will be placed on the motor shaft 8 and it will rotate without requiring any appreciable pressure difference between the pipelines 3 and 4. As the gear lever is pushed towards the high gear position, the friction clutch, for example clutch 41 as shown in FIGURE 2, is engaged slightly and the momentum of the vehicles acting through output shaft 11 and the high gear will tend to drag the shaft 8 round at a speed lower than it was previously rotating when in low gear. Such a drag will cause a pressure differential to be developed between pipelines 3 and 4, the pressure being higher in the pipe 4. In selecting forward displacement, the lever 22 was moved to the left which, in turn, caused rod 82 to move to the right. The higher pressure in the pipe 4 now acts through pipe 87 on the right hand side of the piston 84, tending to reduce its displacement selecting movement. If the driver is still holding the lever 22 the caged spring unit 81 will compress or, alternatively, movement of piston 84 will also move the lever 22. This displacement reducing movement will proceed to the extent that the rate of flow of liquid through the motor 2 is in agreement with the lower rotational speed impressed on shaft 8. When this happens the pump is at the correct displacement and further movement of the gear lever 21 to cause positive engagement of the high gear can be effected entirely smoothly and noiselessly. Immediately on engagement of the high gear the pipes 86 and 87 are isolated from pipes 3 and 4 and the passage 84 will act to equalise pressures between the two ends of cylinders 85 thus allowing control of displacement of the pump to be taken over by the manual lever 22. Vehicle speed may then be increased by moving the lever 22 further in the forward direction to increase pump displacement. When travelling forwardly, if the vehicle needs to climb a gradient and a greater torque is required to be exerted in the drive shaft 11, the driver will move the lever 22 to select a reduced displacement which enables a greater torque to be developed at the motor output shaft 8 although at a lower speed. If the gradient increases to the extent that the torque at ouput shaft 8 cannot be increased to a sufficient extent to keep the vehicle moving up the gradient, it then becomes necessary for the driver to engage low gear and the lever 21 is moved towards the low gear position. Such movement of the lever initially disengages high gear and moves valve 88 to connect the pipes 86 and 87 to the transmission pipelines 3 and 4. As the friction clutch corresponding to clutch 51 in FIGURE 2 is lightly engaged the motor output shaft will be accelerated by the inertia of the vehicle transmitted through output shaft 11 and the gears, and the pipeline 3 will assume a higher pressure than the pipeline 4. Such pressure will act on the piston 84 to urge it to the right to increase the selected transmission pump displacement, thus to cause increase in rate of liquid flow through the motor 2 until the motor drives its output shaft 8 at a speed appropriate to its drive as a result of engagement partially of friction clutch 51. When the motor is rotating at the appropriate speed, lever 21 is pushed fully home to engage low gear, smoothly and noiselessly. The torque is then considerably larger by virtue of the torque multiplying action of the gear box and the driver is able to adjust pump displacement by lever 22 to proceed at an appropriate speed up the gradient. In the event that the driver attempts to engage low gear before the vehicle speed has dropped to a sufficient extent the condition will arise that piston 84 will move rod 6 to select the maximum forward pump displacement without it being possible by this maximum displacement to rotate the motor 2 at a sufficiently high speed to enable the gear to be engaged smoothly and without strain on the transmission. Due to the impossibility of correction of pump displacement, a higher pressure differential develops between pipes 3 and 4 which are, of course, connected to pipes 86 and 87. The higher pressure of the two pipes 86 and 87 is transmitted through pipe 96 and enters cylinder 98. The spring 97 is loaded so that piston 99 does not move at normal pressures developed during gear changing but, at the higher pressure piston 99 and rod 101 will extend to engage lever 21 and prevent actual engagement of low gear. The pawl 102 will engage notch 103, when the lever 21 reaches a position where the friction clutch 51 in the gear box is just not engaged. By such movement the driver will appreciate his error in trying to engage low gear at too high a speed and will necessarily have to brake the vehicle or otherwise have to reduce its speed before attempting to re-engage low gear. The lever can be moved to push piston 99 back into cylinder 98 when only a low pressure exists in cylinder 98 if sufficient force is exerted to unlatch pawl 102 from the notch 103. To prevent high pressure being trapped within the cylinder 98 a vent restrictor 104 is provided to vent liquid to low pressure.

In the examples shown in FIGURES 1 and 3 it is essential either that the engine should operate at a governed fixed speed or, alternatively, that it should not be capable of substantial alternation of its speed during mechanical gear change. This results from the fact that during gear change the pump displacement is adjusted by the variable lever devices so that it is altered inversely in proportion to the change in mechanical gear. In the example described with reference to FIGURE 4, it is not necessary for the engine to be governed for running at a constant speed or to be capable of only altering its speed slowly, since the pressure difference occurring between pipes 3 and 4 is a signal of the variation of the flow rate through the motor 2 from what it should be to cause correct gear engagement, and if the pump driving speed alters during gear engagement, then this is automatically corrected by adjustment of the pump displacement in order to reduce the pressure difference across pipes 3 and 4 to a low value, resulting in correct rotational speed of motor 2.

We claim as our invention:

1. A power transmission for use between a power input shaft and a power output shaft, comprising in combination with the respective shafts, a variable positive displacement hydraulic pump driven by said input shaft, a selectable displacement control for said pump, a positive displacement hydraulic motor hydraulically interconnected to be driven by said pump, a mechanical gear transmission operatively connected intermediate said motor and said output shaft, and having gearing selectively engageable to provide fixed high and low speed gear ratios, means to engage selectively said high or said low speed gearing, a synchronizing device operatively connected with said gear selecting means for shifting during change between high and low speed gear ratios, and operatively connected to said pump displacement control to shift the latter into a position wherein the motor will rotate automatically at a speed appropriate to the rotational speed of the output shaft through the fixed gear ratio being selected, a hydraulic valve connected in the pump output and arranged, when open, to allow an escape flow in excess of a certain pressure, from the hydraulic pump output, and means interconnecting said valve with the fixed gear ratio control and arranged to be shut when a fixed gear is engaged, and to permit restricted flow during change of fixed gear.

2. In combination, an input shaft and an output shaft, a variable speed hydraulic transmission driven by the input shaft, a change speed mechanical gear transmission operable to interconnect the hydraulic transmission with the output shaft at one of a plurality of gear ratios, a pair of control members one of which is connected with the hydraulic transmission and operable to vary the speed thereof and the other of which is connected with the mechanical transmission and operable to alter the speed ratio thereacross by disengaging the gearing at said one gear ratio and re-engaging it at a new gear ratio, and synchronization means connected with the hydraulic transmission control member and responsive to the operation of the mechanical transmission control member toward a speed ratio alteration to adjust the speed of the hydraulic transmission to the effect that the speed ratio defined by the speed of the hydraulic transmission and the output shaft becomes synchronous with the speed ratio defined by the new gear ratio which will exist across the mechanical transmission upon re-engagement of the gearing.

3. In combination, an input shaft and an output shaft, a variable speed hydraulic transmission comprising a variable positive displacement pump driven by the input shaft and a positive displacement hydraulic motor driven by the pump, a change speed mechanical gear transmission operable to interconnect the motor with the output shaft at one of a plurality of gear ratios, a pair of control members one of which is connected with the pump and operable to vary the speed of the motor by changing the displacement of the pump and the other of which is connected with the mechanical transmission and operable to alter the speed ratio thereacross by disengaging the gearing at said one gear ratio and re-engaging it at a new gear ratio, and synchronization means connected with the pump displacement control member and responsive to the operation of the mechanical transmission control member toward a speed ratio alteration to adjust the speed of the motor to the effect that the speed ratio defined by the speed of the motor and the speed of the output shaft becomes synchronous with the speed ratio defined by the new gear ratio which will exist across the mechanical transmission upon re-engagement of the gearing.

4. The combination according to claim 3 wherein the pump displacement control member has a variable connection with the pump and the synchronization means is responsive to the operation of the mechanical transmission control member toward a speed ratio alteration to vary the connection between the pump displacement control member and the pump.

5. The combination according to claim 3 wherein the mechanical transmission control member has a variable connection with the pump displacement control member and is operative through three successive stages of control in the first and third of which it operates through the pump displacement control member to vary the speed of the motor by changing the displacement of the pump and in the intermediate of which it operates to alter the speed ratio across the mechanical transmission by disengaging the gearing at said one gear ratio and re-engaging it at a new gear ratio, and the synchronization means is responsive to the operation of the mechanical transmission control member through the aforesaid intermediate stage thereof to vary the connection between the control members.

6. The combination according to claim 5 wherein the mechanical transmission control member is connected with the mechanical transmission by a first servo motor and with the pump displacement control member by a second servo motor, and the synchronization means is responsive to the operation of the mechanical transmission control member through its intermediate stage to actuate the first servo motor to alter the speed ratio across the mechanical transmission by disengaging the gearing at said one gear ratio and re-engaging it at a new gear ratio, and to actuate the second servo motor to vary the connection between the control members.

References Cited in the file of this patent

UNITED STATES PATENTS

| | | |
|---|---|---|
| 1,915,986 | Ferris | June 27, 1933 |
| 2,222,144 | Ferris | Nov. 19, 1940 |
| 2,833,160 | Morgan | May 6, 1958 |
| 2,876,656 | Herndon | Mar. 10, 1959 |
| 2,939,342 | Woydt et al. | June 7, 1960 |
| 3,074,296 | Ebert | Jan. 22, 1963 |